Nov. 18, 1969  G. L. CLAPPER  3,479,460
SPEECH ANALYSIS SYSTEM
Filed Dec. 29, 1966  10 Sheets-Sheet 1

FIG. 1

INVENTOR
GENUNG L. CLAPPER

BY *Andrew Teras*
AGENT

Nov. 18, 1969     G. L. CLAPPER     3,479,460

SPEECH ANALYSIS SYSTEM

Filed Dec. 29, 1966     10 Sheets-Sheet 3

ENVELOPE PEAK DETECTOR

FIG. 7

Nov. 18, 1969     G. L. CLAPPER     3,479,460

SPEECH ANALYSIS SYSTEM

Filed Dec. 29, 1966

Nov. 18, 1969  G. L. CLAPPER  3,479,460
SPEECH ANALYSIS SYSTEM
Filed Dec. 29, 1966  10 Sheets-Sheet 9

Nov. 18, 1969   G. L. CLAPPER   3,479,460
SPEECH ANALYSIS SYSTEM
Filed Dec. 29, 1966   10 Sheets-Sheet 10

United States Patent Office 3,479,460
Patented Nov. 18, 1969

3,479,460
SPEECH ANALYSIS SYSTEM
Genung L. Clapper, Raleigh, N.C., assignor to International Business Machines Corporation, Armonk, N.Y., a corporation of New York
Filed Dec. 29, 1966, Ser. No. 605,646
Int. Cl. G10l 1/02
U.S. Cl. 179—1                                8 Claims

ABSTRACT OF THE DISCLOSURE

A speech analyzer for the synchronous location of harmonics in each pitch period of a sound spectrum. Data is provided to a storage matrix by employing a time measurement which begins with the "glottal impulse" of each first local maximum in the complex input waveform. The input waveform is split into three parts by the fricative selector, which selects high frequencies, the harmonic locator, which selects medium frequencies, and the envelope peak detector, which selects the low frequencies. These three selectors control the scan ring and the time base ring which in turn control the storage matrix. The storage matrix stores the sound characteristics extracted from the waveform to produce bit characteristics defining the structure of the sound wave.

---

The invention relates to a speech analyzer, and more particularly, to a speech analyzer for the synchronous location of harmonics in each pitch period of a sound spectrum.

The prior art is replete with a variety of systems for the analysis of speech sounds for recognition purposes. Among these are the systems employing contiguously oriented filters, while other systems have employed the zero crossing count technique to determine the frequency components in the complex speech waveforms.

The prior art systems have been impractical from the standpoint of economy; in the former systems the filters not only were expensive items but also required excessive space requirements, whereas in the latter systems, problems of reliability have imposed very high tolerances in the components required.

The present invention is more akin to the speech compression concept employed by Matthews and others particularly in the use of "extremal coding" to represent speech waveforms by data predicated upon the presence of peaks and valleys in the waveforms. Although broadly related to the above speech compression concept, the present invention goes much further to provide data which is more meaningful by employing a time measurement which initiates with the "glottal impulse" of each first local maximum in the complex waveform. Because of the highly damped resonant conditions in the vocal mechanism, the first local maximum is more predominate than subsequent ones in the same pitch period. Accordingly, this first maximum is utilized to establish the beginning of the time interval which is initiated in response to the glottal impulse, as such this time interval is utilized as a measure of frequency. The time interval and the frequency are related by the expression $F = 1/T$ in which F is expressed in kilocycles per second, and the time T in milliseconds.

The primary object is in the provision of a novel technique for speech analysis which locates the harmonic content in the speech spectrum as a function of time rather than of frequency, by virtue of which the above prior art disadvantages are avoided.

Another object of the present invention is to provide speech characteristics from selected portions of the speech spectrum which are more meaningful than those provided by the prior art systems.

Yet another object is to provide a highly flexible speech analyzing system in which the frequency range and resolution are variable by virtue of the fact that time rather than frequency is utilized as the factor of measurement.

The foregoing and other objects, features and advantages of the invention will be apparent from the following more particular description of a preferred embodiment of the invention, as illustrated in the accompanying drawings.

In the drawings:

FIG. 2 shows how FIGS. 2a, 2b, 2c and 2d are combined to form a more detailed representation of the invention.

Figure 1:
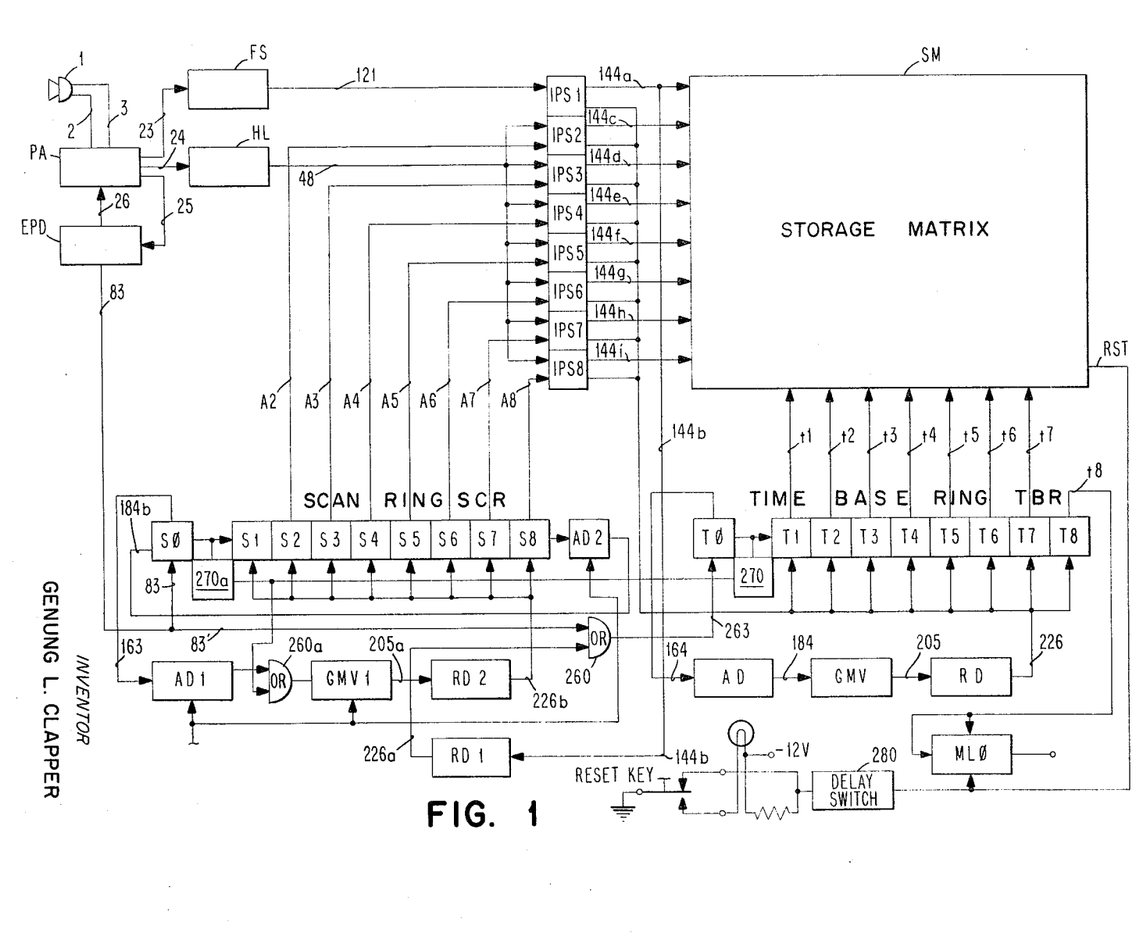
FIG. 1 is a block diagram of the invention.

A brief description of the invention will now be given. Referring to FIG. 1 speech sounds impressed on the microphone 1 are converted to electrical signals and transmitted by way of lines 2 and 3 to a pre-amplifier. Therein the signals are amplified under control of an automatic gain control signal derived from gain control means forming a part of an envelope peak detector EPD interconnected to the preamplifier by way of lines 25 and 26. As a result of this control, the pre-amplifier PA provides three outputs; a high frequency output containing high frequency noise-like components transmitted by way of line 23 to a fricative selector FS, a middle range of frequencies ranging from 250 c.p.s. to 3000 c.p.s., transmitted by way of line 24 to a harmonic locator HL, and a low frequency component transmitted by way of line 25 to the envelope peak detector EPD. Thus the complex sound wave form entering the microphone 1 produces the three output frequencies described. The system further includes a storage matrix SM of the coincidence type to which entry is made under control of a scan ring SCR and a time base ring TBR. This matrix is used to store the different sound characteristics extracted by the present invention from the range of signal frequencies to product bit characteristics defining the structure of the sound wave form produced from the speech sounds entering the microphone.

Each of the rings includes means for initiating and controlling the advance of the ring. In response to voiced sounds occurring at the beginning of a spoken word both rings SCR and TBR, are initiated into activity under control of the envelope peak detector EPD, the scan ring SCR being initiated by way of line 83, and the timing base ring TBR by way of lines 83, 83', OR circuit 260, line 263 to the first stage of the time base ring TBR. The presence of a fricative sound, on the other hand, at the beginning of a spoken word initiates the activity of the time base ring TBR only and this is by way of a line 144b, ring driver RD1, line 226a, OR circuit 260 and line 263.

The rate of ring advance is controlled by appropriate delay devices, multivibrators, and ring drivers. The advancement of the scan ring SCR is under control of multivibrator output signals issued from a multivibrator GMV1, line 205a, driver RD2 and line 226b. The multivibrator GMV1 in turn is controlled by a delay means AD1 or by the output from an inverter 270a both of which are connected to the OR circuit 260a which provides the multivibrator GMV1 with the necessary start signal by way of line 263a.

The advancement of the time base ring TBR is controlled by means of a multivibrator GMV connected by way of a line 205 to a ring driver RD in turn connected to the ring by way of line 226. Input to the multivibrator GMV is by way of line 184 connected to the output of a delay means AD whose input is connected to a line 164 extending to the first stage of the ring TBR.

The activation and advance of the time base ring TBR provides the storage matrix SM with appropriate output signals on lines t1 through t7. Activation and advance of the scan ring SCR provides output signals on lines s2 through s8 which, in coincidence with the harmonic locator output signal on line 48, progressively energize the integrated pulse shaper IPS2 through IPS8. Integrated outputs from these pulse shapers are passed on appropriate lines 144c through 144i connected to the storage matrix SM, these outputs occurring when the spoken word begins with a voiced sound. However, when the initial sound is a fricative, only the time base ring TBR provides output signals to the storage matrix SM by way of lines t1 through t7. These signals in conjunction with the output of pulse shaper IPS1 on the output line 144a are the only signals utilized to store appropriate bit signals characteristic of the initial fricative sounds.

Before entering upon a detailed description of the present invention, it might be appropriate at this point to describe the details of the various components constituting the present invention.

SPEECH PRE-AMPLIFIER

Figure 3:
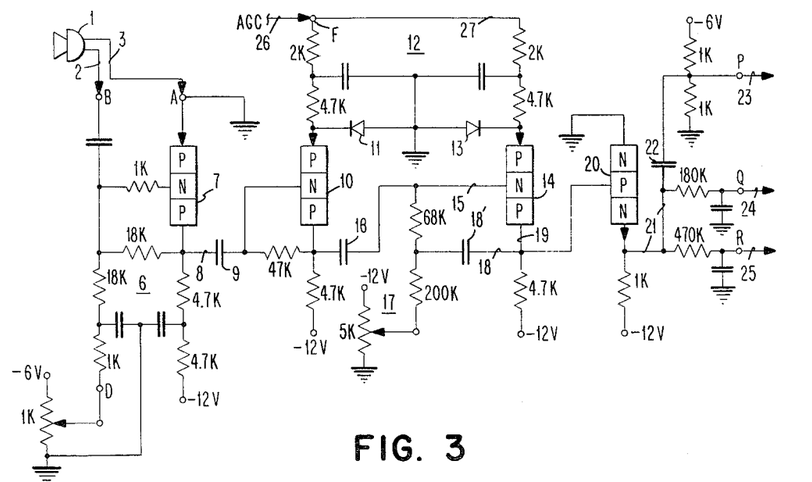
FIG. 3 shows details of a pre-amplifier.

The speech pre-amplifier PA shown in FIG. 3 includes input lines 2 and 3 with the former connected to an RC network 4 terminating with a sensitivity control means 5 in turn connected between ground and a —6 volt supply. Line 3 is connected to the emitter 7e of a transistor 7, and the base 7b and collector 7c thereof being resistively coupled to the network 4. The emitter 7e is also connected to ground and the collector 7c is resistively coupled to a —12 volt supply. A grounded capacity network 6 further interconnects the network 4 to the collector 7c of the transistor 7. The output of the transistor 7 is coupled by way of line 8 and capacitor 9 to the base 10b of transistor 10. This output is also resistively coupled to collector 10c of the transistor 10. The emitter 10e is connected to ground by way of a diode 11 and also to an RC network 12 which is coupled to ground by way of a diode 13 and also to emitter 14e of transistor 14. The base 14b of the transistor 14 is capacitively coupled by way of line 15 to the output line 16 extending from the transistor 10. The output line 16 is resistively coupled to an output level control means 17 connected between ground and —12 volt supply. This output is also capacitively coupled by way of line 18 which is also connected to an output line 19 extending between the collector output of transistor 14 and the base 20b of transistor 20. The line 18 including capacitor 18' serves as a degenerative coupling which is effective at low frequencies of about 15 c.p.s. to provide stabilization. Transistor 20 has its collector grounded and the emitter 20e resistively coupled to a —12 volt supply and also to an output network consisting of lines 23, 24 and 25. An automatic gain control signal AGC 26 extends from the envelope peak detector EPD and joins the RC network 12 at a point 27, whereby a wider range of control is exercised by virtue of the fact that the AGC signal is impressed across the two successive stages namely transistors 10 and 14 to provide moothed outputs for automatic gain control and harmonic analysis. The pre-amplifier PA thus provides, under control of the AGC signal, a high frequency output on line 23 which contains the high frequency noise-like components for operation in the fricative selector; an output on line 24, constituting a middle range of frequencies from 250 cycles per second to 3000 cycles per second for operating the harmonic locator HL; and an output on line 25 which contains only the low frequency components for operating the envelope peak detector EPD.

FRICATIVE SELECTOR

Figure 8:
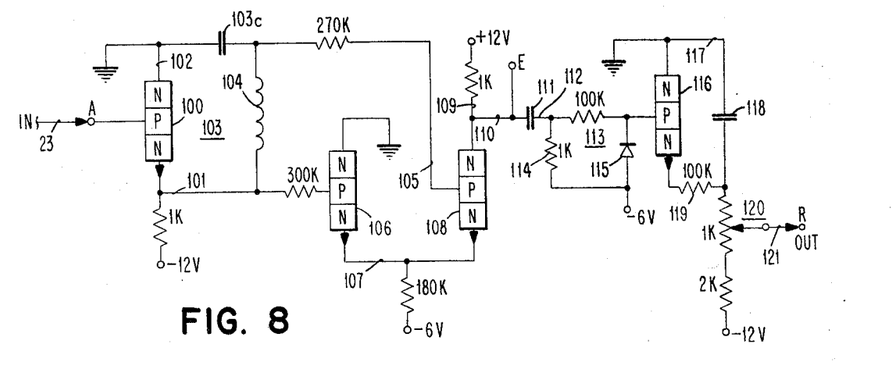
FIG. 8 shows details of a fricative selector.

The fricative selector shown in FIG. 8 comprises essentially three transistors 100, 106 and 108 and an LC network 103. Input signals of high frequency noise-like characteristics are applied by way of line 23, extending from the pre-amplifier PA, to the base of transistor 100. The emitter of transistor 100 is resistively coupled to a —12 volt supply and also by way of line 101 to the base of transistor 106. The collector of transistor 100 is coupled to the base of transistor 108 by way of lines 102 and 103 and a capacitor 103c. An inductor of 2.5 mh. is connected across lines 105 and 101. The emitters of transistors 106 and 108 are connected by line 107 in turn resistively coupled to a —6 volt supply. The collector output of transistor 108 is connected to a +12 volt supply by way of line 109 and also to the base of transistor 116 by way of paths 110 and 112 with a capacitor 111 connected therebetween. Also connected between line 112 and a —6 volt supply is a network 113 which includes a transistor 114 and a diode 115. The emitter of the transistor 116 is resistively coupled by way of line 119 to a potentiometer 120 in turn connected to an output line 121. The collector of the transistor is connected to a grounded line 117 in turn coupled by way of capacitor 118 to the potentiometer 120.

The transistor 100 serves as a driver while transistors 106 and 108 in combination serve as a difference amplifier with the LC network 103 providing a delay. The output from the fricative selector FS, on line 110, consists of high frequency noise-like signals above 4 kc. The rectifying network comprising network 113 and transistor 116 provide a DC level which is proportional to the peak to peak signals presented to the input network 113.

HARMONIC LOCATOR

Figure 4:
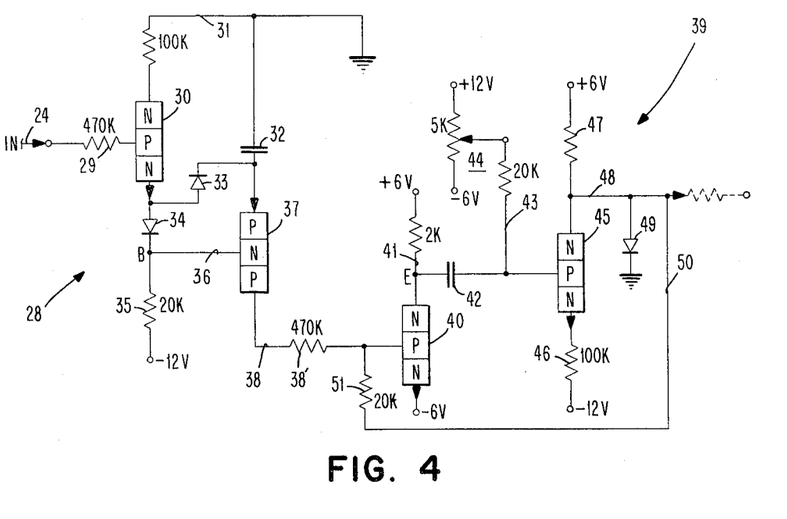
FIG. 4 shows details of a harmonic locator.

The harmonic locator, shown in FIG. 4, comprises a peak locator 28 and a univibrator 39, the former determining points of peak amplitude and the latter standardizing the output pulse. The peak locator 28 includes a pair of transistors 30 and 37 connected in the manner shown. Input to the transistor 30 is from the line 24 through a transistor 29 in turn connected to base 30b of the transistor 30. Collector 30c is coupled to ground by way of a resistor 31 and also to emitter 37e of transistor 37 by way of a capacitor 32. The output from emitter 30e is coupled through diode 33 to a point A in the circuit path connected to emitter 37e. The base 37b of transistor 37 is coupled to a point B situated in the path between diode 34 and a resistor 35 terminating at a —12 volt supply. The output from the collector 37c which represents the output of the peak collector 28 extends through a line 38 connected to base 40b of transistor 40 which is the input to the univibrator 39. The transistor 40 has its emitter 40e connected to a —6 volt supply, and the collector 40c connected to a +6 volt supply by way of line 41. From a point E a path 42 including a capacitor 42' proceeds to the base 45b of a transistor 45. From a point F in this path a width adjustment potentiometer 44 is connected through a line 43. The emitter 45e is connected to a —12 volt supply by way of a line 46, and the collector 45c of the transistor 45 is connected by way of line 47, to a +6 volt supply and to an output line 48 which is grounded by means of a diode 49. A feed-back path 50 including a resistor 51 interconnects the output line to the base of transistor 40.

In the operation of the harmonic locator the input speech waveform is limited to a peak to peak amplitude of about two volts. Points of peak amplitude are determined by the novel peak locator circuit combined with a univibrator for output pulse standardizations. On the first large positive peak of the pitch period representing the fundamental excitation, transistor 30 acts as an emitter follower power driven to charge capacitor 32 through the diode 33. This will drive point A to its most positive value, about −2 volts. Simultaneously, transistor 30 drives point B through the diode 34 to the same voltage level. Thus, during positive slopes of the complex waveform, no appreciable voltage difference appears between points A and B, as a result of which transistor 37 does not conduct, points C and D are maintained near −12 volts, transistor 40 is cut off, point E is held at +6 volts and point F at about −6 volts. Current flows from the width adjustment potentiometer 44, through a 20K resistor in the line 43, to the base of transistor 45 to keep this transistor strongly conducting so that the output is held near −12 volts. Under fully loaded conditions, as maximum current flows in the external load, the output in the line 48 may rise to −10 volts.

Assuming the worst condition during the position charging portion of the first large positive peak, point B will be slightly higher than A since less current flows in diode 33 than in diode 34, thus cutoff of transistor 37 is assured. As the peak is reached, the voltage conditions reverse, since diode 34 is now conducting more current than diode 33, and as the peak is passed, diode 33 is reversely polarized, point B drops below A and transistor 37 conducts and as a result, points C and D are driven rapidly to −6 volts while point C continues to rise slightly above point D as current flows from capacitor 32 through transistor 37 and the series limiting resistor 38' to the base of transistor 40. This causes a sharp drop in voltage at point E from +6 to −6 volts. This transient is conducted by capacitor 42' to point F which drops sharply from −10 volts to about −20 volts cutting off previously conducting transistor 45. The resultant positive rise at the output is coupled back through 20K resistor 51 to point D to assure that transistor 40 will remain conducting throughout the full duration of the output pulse. The duration is determined by the RC product of capacitor 42', the 20K resistor 5' and the setting of potentiometer 44. The pulse width, for the components shown in the network may be varied from 150 μsec. to 450 μsec.

Figure 5:
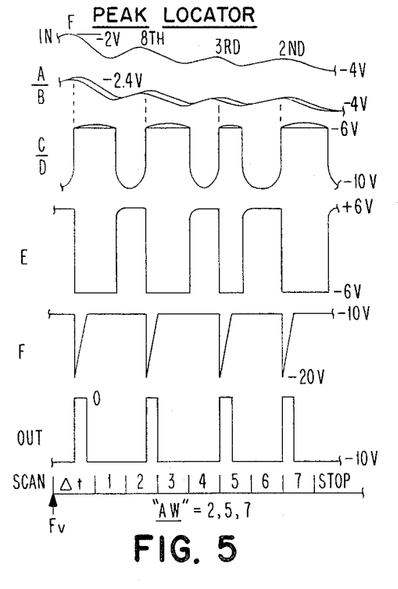
FIGS. 5 and 6 show voltage curves and the harmonics for the vowel sounds "aw" and "oh."
Figure 6:
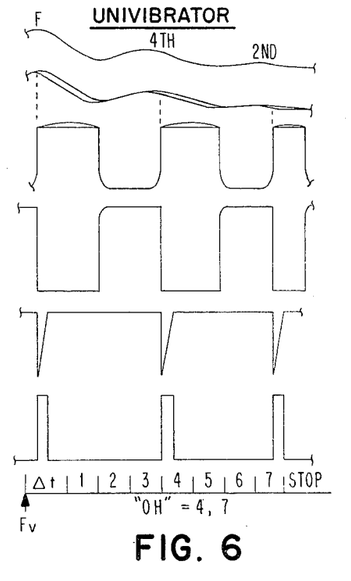

In general, the termination of the pulse will not cut off the transistor 40, since the negative slope may still keep transistor 37 on, and transistor 40 will stay on until the "valley" is reached after pulse termination. At this point, transistor 30 again begins to charge capacitor 32, transistor 37 cuts off and points C and D drop to cut off transistor 40. Point E now rises to +6, charging capacitor 42' in preparation for the next pulse output. This pulse marks the presence of the most prominent harmonic in the complex speech waveform and its position in time. The waveforms in FIGS. 5 and 6 show the difference between the vowel sounds "aw," as in "call," and the vowel sound, "oh," as in "over." It is seen that the vowel "aw" has 8th, 3rd, and 2nd harmonics whereas "oh" has only the 4th and 2nd harmonics. This produces an output for "aw" during time periods 2, 5 and 7 as opposed to the output for "oh" during periods 4 and 7. In this way, separate codes are produced for voiced sounds. This includes vowels and the voiced consonants such as V, Z, etc. Consonants that are unvoiced are not coded by the harmonic locator, these portions of the spoken word being accommodated in the manner described in a co-pending application Serial No. 474,230, filed July 23, 1965.

ENVELOPE PEAK DETECTOR

Figure 7:
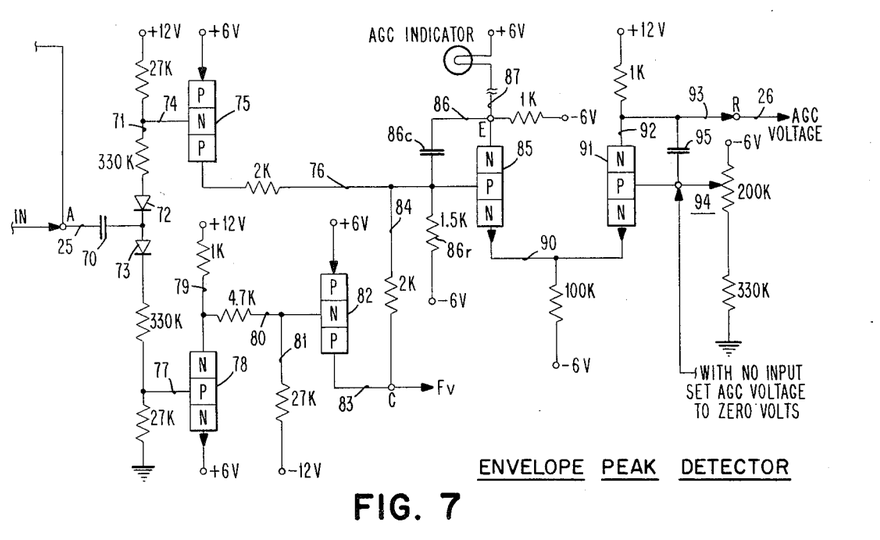
FIG. 7 shows details of an envelope peak detector.

The envelope peak detector comprises essentially three transistors, 75, 78 and 82 connected in the manner shown. The incoming signal line 25 is connected by way of a capacitor 70, to a divider network 71 including, among other components, diodes 72 and 73. Input to the base of transistor 75 from the network 71, is by way of a line 74, and input to the base of transistor 78 is by way of a line 77. The emitters of the transistors 75 and 78 are connected each to a +6 volt supply. Output from the collector of transistor 75 is fed to an output line 83 by way of lines 76 and 84. The collector of transistor 78 is connected by way of line 79 to a +12 volt supply and also to the base of transistor 82 by way of a line 80 which is resistively coupled by way of line 81 to a −12 volt supply. The transistor 82 has its emitter connected to a +6 volt supply and the output of the collector is connected to the output line 83.

Transistor 75 is utilized to monitor negative peaks arising during negative voltage excursions of the signals appearing in the network 71, and provides positive signals, through inversion, on the output line 83, by way of lines 76 and 84.

The transistors 78 and 82 monitor the positive peaks, arising during positive excursions, which are impressed on the output line 83. These positive peak voltages thus provide the fundamental frequency which is utilized to control operations of the scan ring SCR and the time base ring TBR.

Transistors 85 and 94 are utilized for the AGC function. Transistor 85 influences the fundamental frequency by way of the line connection 76 to the base thereof to which is also connected an integrating network 86 which includes a capacitor 86c and a resistor 86r connected to a −6 volt supply. The opposite end of the network 86 is connected to a −6 volt supply, a line 87 including an AGC indicator which terminates at a +6 volt supply, and finally to the collector of transistor 85. The emitter of transistor 85 along with the emitter of transistor 91 are connected by a line 90 in turn resistively coupled to a −6 volt supply. The collector output of transistor 91 is tapped to a +12 volt supply by way of line 92 and to an output line 93 in turn connected to the line 26. The base of transistor 91 is controlled by a potentiometer 94 also coupled to the line 93 by way of a capacitor 95. The transistors 85 and 91 function primarily as an amplifier by which balanced integration is achieved to obtain the proper AGC range of positive phased signals.

INTEGRATING PULSE SHAPER

Figure 9:
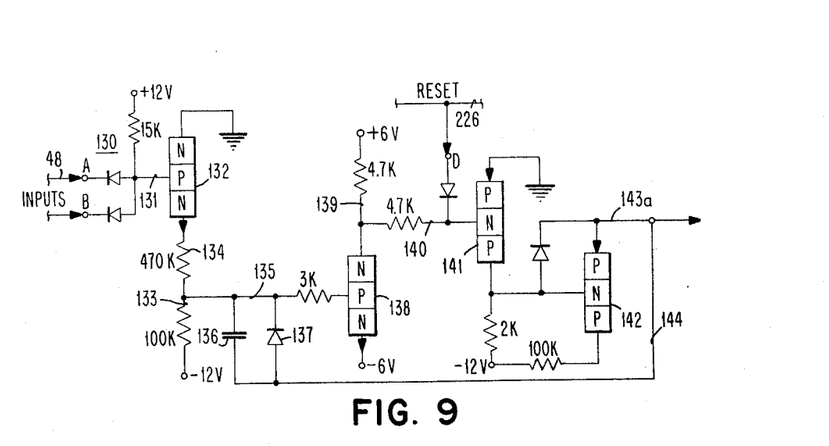
FIG. 9 shows details of an integrating pulse shaper.

The integrating pulse shaper IPS shown in FIG. 9 comprises an AND circuit 130, a driver transistor 132, an RC network including resistor 134 and capacitor 136, a threshold transistor 138 connected to a latch configuration constituted of transistors 141 and 142. The AND circuit 130 is connected by way of line 131 to the base of transistor 132 which has its collector grounded and its emitter connected to a resistive path 133 terminating at a −12 volt supply. The path 133 is connected in turn to a path 135 connected to the base of the threshold transistor 138, and also to the capacitor 136 in turn connected to a latch back path 134 which also includes diode 137 connected to the path 135. The threshold transistor 138 has its emitter connected to a −6 volt supply and its collector connected to a +6 volt supply by way of a resistive path 139. A resistive path 140 interconnects the collector of transistor 138 with the base of transistor 141, the latter being interconnected in the manner shown to the transistor 142 providing a pushpull device for the latch configuration whose output is passed on to line 143 also connected the latch back path 144 which is interconnected, by way of the diode 137, to the base of the threshold transistor 138.

Figure 2:
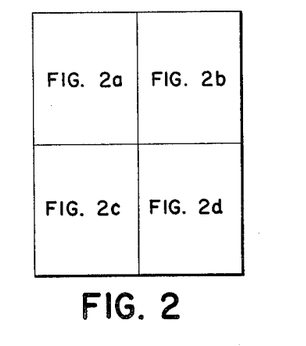
Figure 2A:
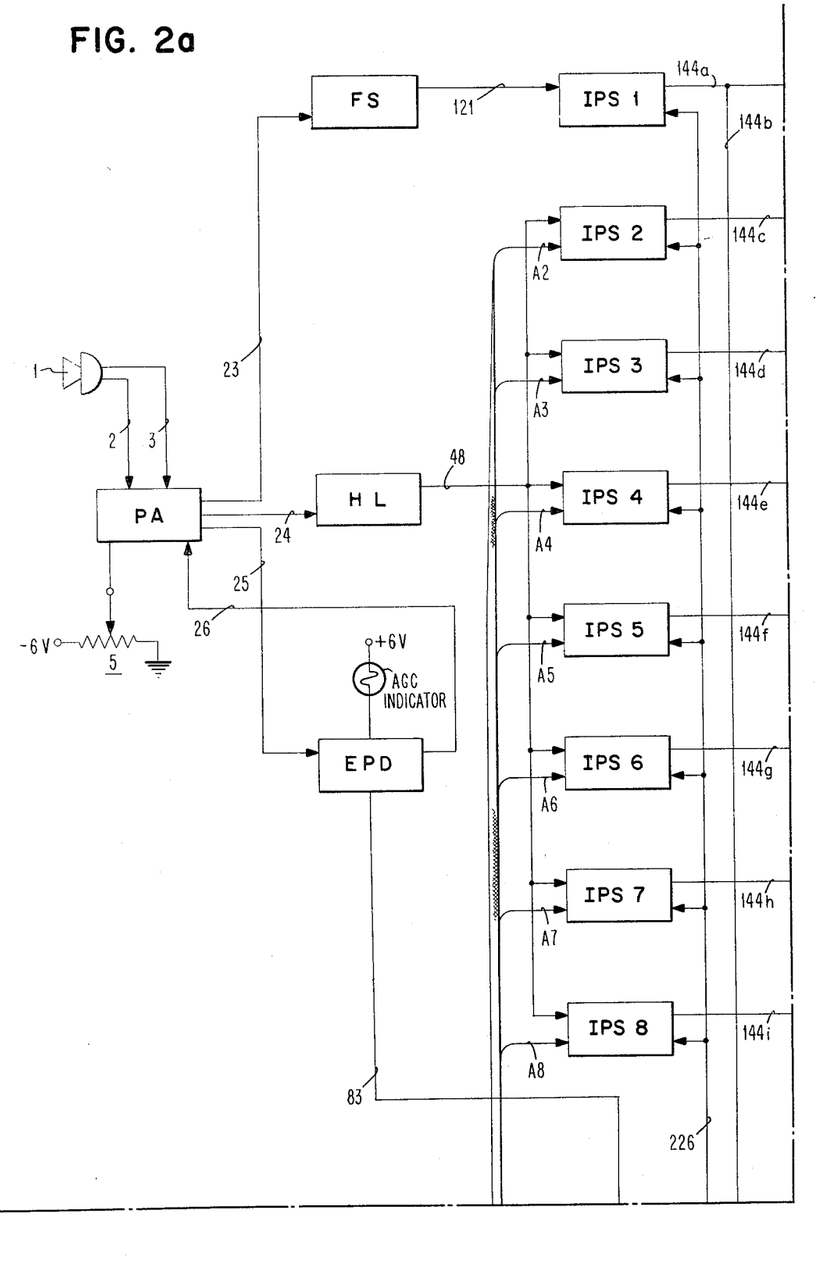

In the operation of the integrating pulse shaper, the coincidence of input signals, from the harmonic locator and the scan ring, at the AND circuit 130 provides an output signal on the line 131 which renders the driver transistor 132 conductive. This results in the passage of current through the RC network constituted of the resistor 134 and the capacitor 136. When a certain charge is reached, based on the time constant of ½ ms., the threshold transistor 138 is rendered conductive to cause conduction in the pushpull arrangement constituted of transistors 141 and 142. Conduction in these transistors 141 and 142 is maintained until a reset signal is applied by way of line 226, whereupon the transistor 141 is cut off and the output on the line 143 drops from a zero voltage to a −12 volt level. In FIG. 2a, eight of the integrating pulse shapers are employed and these are referenced IPS1 through IPS8 with their respective outputs referenced 144a through 144i. Inputs to the shapers IPS2 through IPS8 are derived from the harmonic locator output line 48 and from lines s2 through s8 cabled from outputs of stages S2 through S8 of the scan ring SCR shown in FIG. 2c.

LATCH ML

Figure 10:
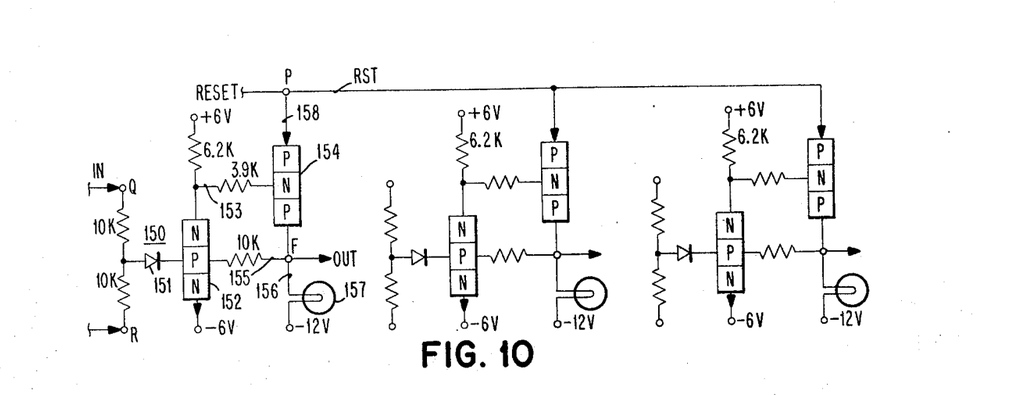
FIG. 10 shows details of a matrix latch.

The storage matrix SM is constituted of latches ML, MLϕ, ML56, a typical one being shown in FIG. 10. Each latch comprises an input coincidence network 150 connected by way of a line 151 to the base of transistor 152 whose emitter terminates at a −6 volt supply, and the collector resistively coupled to a +6 volt supply. The collector output is resistively coupled by way of line 153 to the base of transistor 154 whose collector is resistively coupled by way of line 155 to the base of transistor 152. A latch indicator 157 is also connected to the collector of transistor 154 by way of the line 156. The emitter of transistor 154 is connected by way of line 158 to a reset line RST.

In the operation of the latch both transistors 152 and 154 are cut off following the application of a reset signal on the line 158. The base of transistor 152 is held below −6 volts by the output from the collector of transistor 154. The latter is held off by a line 153 connected to the collector of transistor 152 which is near +6 volts. If both inputs to the AND circuit are near −12 volts, the base of transistor 152 is also near −12 volts. With one input at −12 volts and one at ground, the latch is maintained at cut off.

When both inputs are raised to about ground (0 volt), current flows in the base of transistor 152 to turn the latter on. The collector drops and turns on transistor 154 which raises its collector to near ground to cause the indicator lamp to light. The resistive path 155 enables sufficient base current to flow to keep transistor 154 on, even though both inputs should drop to −12 volts. The isolating input diode 151 is backbiased for this condition so that base current does not flow away from the base of transistor 152. Thus, the latch will stay on until reset.

ADJUSTABLE DELAY

Figure 11:
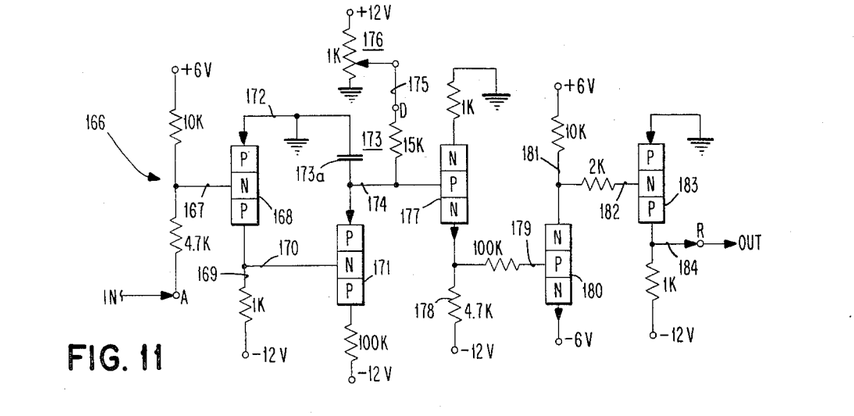
FIG. 11 shows details of a delay unit.

The adjustable delay AD is shown in FIG. 11 and comprises a network which includes five transistors, namely, 168, 171, 177, 180 and 183, and an adjustable RC network 173. Incoming signal excursions of approximately 12 volts are presented to an input divider network 166, through a line 167 to the base of transistor 168 which is further coupled to transistor 171 by way of circuit paths 170 and 172. Path 170 interconnects the collector of transistor 168 to the base of transistor 171 and the path 172 includes a capacitor 173a and interconnects the emitters of transistors 168 and 171. The emitter of transistor 171 is connected to the base of transistor 177 by way of a line 174 to which is also tapped the network 173 which includes line 175 and a potentiometer 176. The emitter of transistor 177 is connected to a −12 volt supply by way of a line 178 and also interconnects the base of transistor 180 by way of a resistive line 179. The collector output of transistor 180 extends to a +6 volt supply by way of a line 181 and interconnects the base of transistor 183 by way of a resistive path 182. The collector of transistor 183 is connected to a −12 volt supply and the collector output is impressed on output line 184.

Figure 2B:
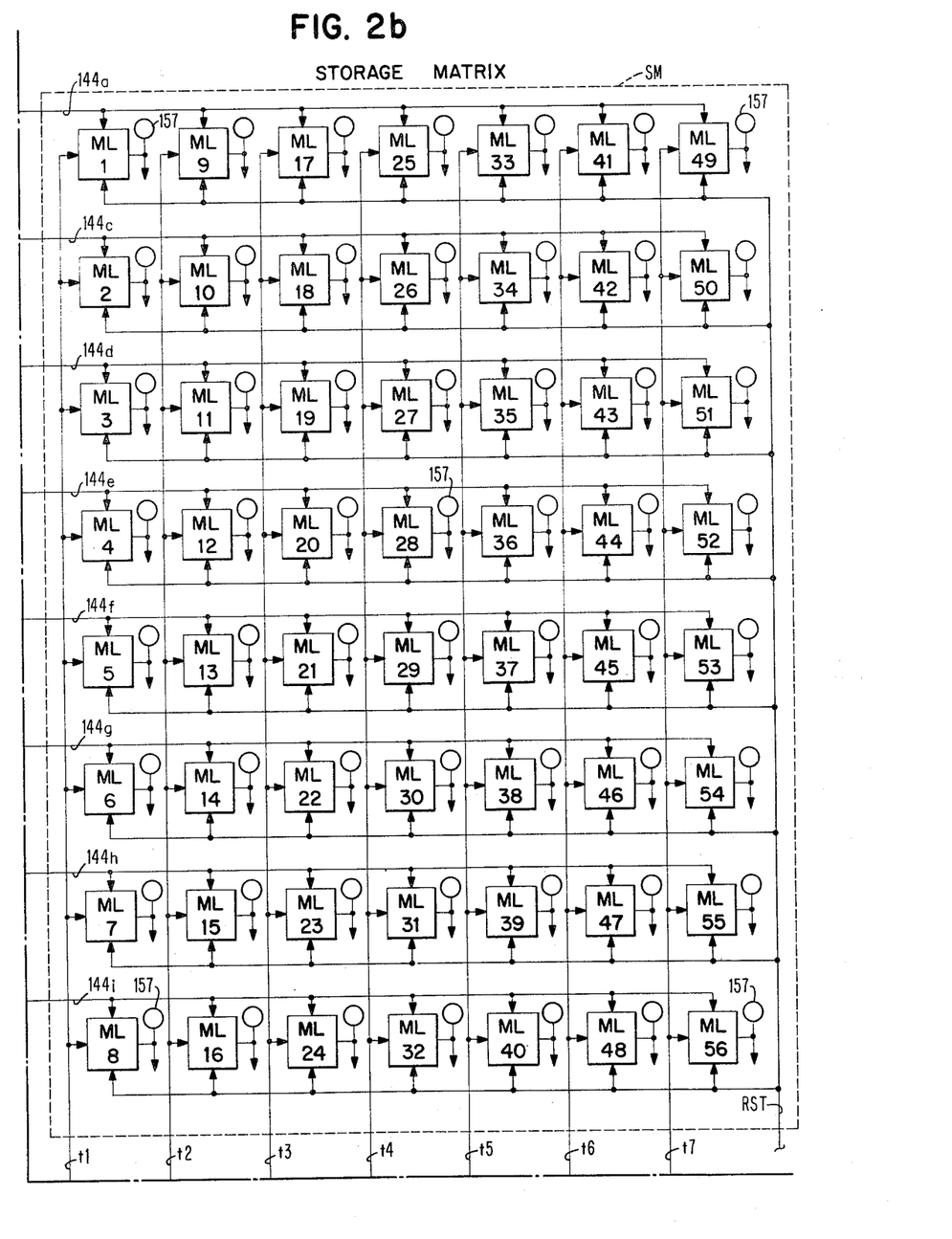
Figure 2C:
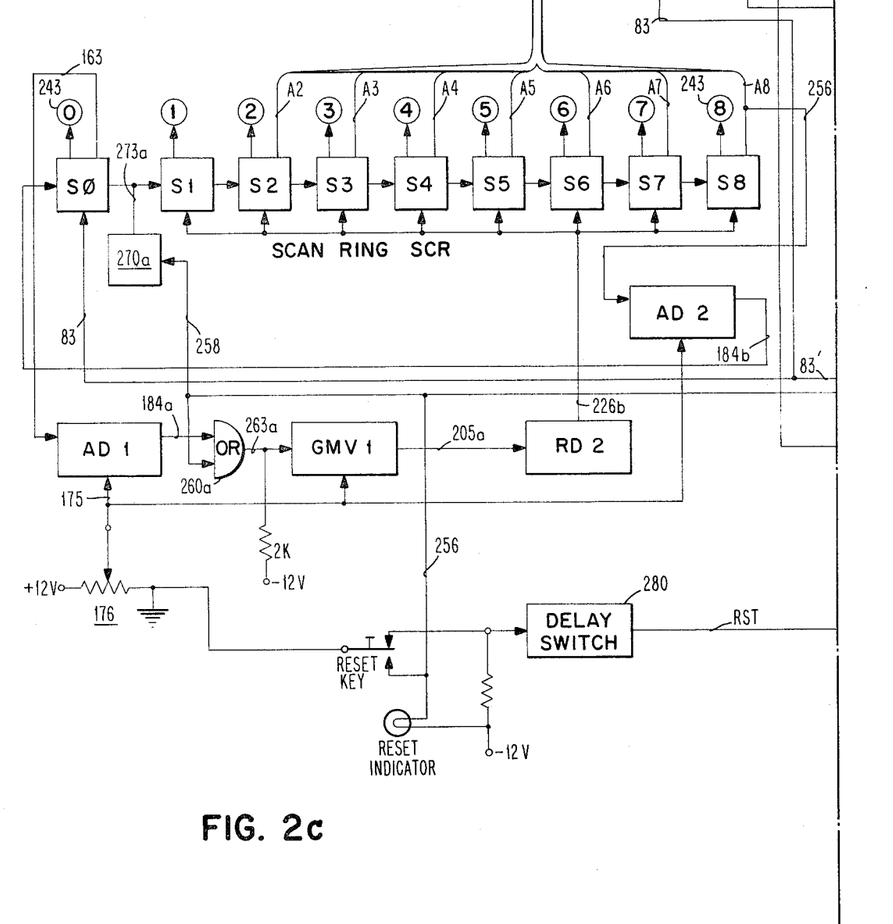

In operation, when the incoming signal level drops from zero volt to −12 volts, transistor 168 conducts and charges capacitor 173a which forms a part of the network 173. The charging of the capacitor causes a delay rise from −12 volts to a −6 volts at the emitter output of transistor 171. This delayed rise is passed on through the emitter follower transistor 177 and in combination with transistors 180 and 183, provided a delay square wave output on the line 184. This delayed square wave output is utilized to complete the scan signal of the scan ring SCR by storing the end of the s8 pulse from the last stage of the ring for about a period of about 3 ms. before turning on the initial stage Sϕ. This delays the turning off of the gated multivibrator GMV and also prevents spurious ring starts which would be occasioned by noise transients passing through the envelope peak detector EPD. The adjustable delay associated with the scan ring SCR, in FIG. 2c, are referenced AD1 and AD2 respectively with their output lines referenced 184a and 184b respectively.

GATED MULTIVIBRATOR

Figure 12:
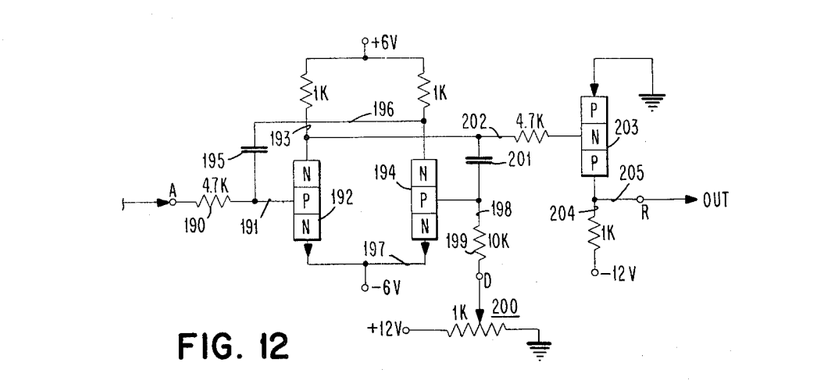
FIG. 12 shows details of a gated multivibrator.

The gated multivibrator GMV shown in FIG. 12 comprises essentially three transistors 192, 194, 203, an RC network, a rate control potentiometer 200, all of which are connected in the manner shown. Incoming gating signals are fed across a gating resistor 190 through line 191 to the base of transistor 192 whose emitted is interconnected with the emitter of transistor 194 by way of line 197 which is connected to a −6 volt supply. The collectors of transistors 192 and 194 are resistively intercoupled by way of line 193 also connected to a +6 volt supply. The collector of 194 is cross coupled to the base of transistor 192 by way of a line 196 and a charging capacitor 195. The collector of transistor 192 is resistively coupled by way of line 202 to transistor 203. Also connected to the base of transistor 203 is an RC network 198 which includes a capacitor 201, resistor 199 and the rate control potentiometer 200. The emitter of transistor 203 is grounded and the collector is resistively coupled to a −12 volt supply by way of a line 204. The collector output passes through output line 205.

In the operation of the multivibrator GMV, a gate signal when raised from a −12 volt level to ground is passed through the gating resistor 190 to charge capacitor 195 and after a brief delay, depending upon the time constant of this RC combination, the transistor 192 is driven into conduction and the transistor 194 is cut off, as a result of which transistor 203 is driven into conduction to provide an output on the line 205. Multivibrator action continues between the transistors 192 and 194 as each alternately conducts and the action continuing so long as the input gate signal is up, dropping this gate signal to −12 volts terminates the multivibrator action. The frequency of the multivibrator action is under the control of the RC network 198 and the setting of the rate control potentiometer 200. The multivibrator associated with the scan ring SCR, in FIG. 2c, is referenced GMV1 and its output line 205a.

RING DRIVE

Figure 13:
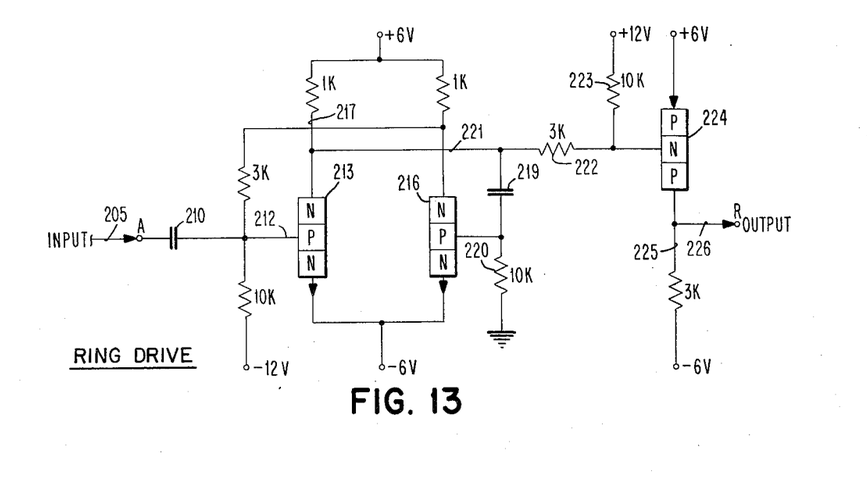
FIG. 13 shows details of a ring driver.

The ring drive RD, shown in FIG. 13 comprises transistors 213, 216 and 224 connected in the network shown. Input timing signals enter the ring drive by way of a capacitor 210, line 212 to the base of transistor 213 whose emitter is connected to a −6 volt supply, and the collector to +6 volts by way of a resistor 217. Transistor 216 has its base connected to the collector of transistor 213 by way of a coupling capacitor 219 and also to ground by way of a 10K resistor 220. The collector output of transistor 213 is fed into the base of transistor 224 by way of a line 221 and a resistor 222. A 12 volt supply is connected to the base of transistor 24 by way of resistor 23. The emitter of transistor 224 is connected to a +6 volt supply and the collector, to a —6 volt supply. The collector output is passed on to line 225 which is connected to the open ring drive line 195.

In operation, timing signals issued by the gated multivibrator GMV enter the ring drive by way of the capacitor 210. Transistors 213 and 216 in conjunction with the capacitor 219 and resistor 220 function as a pulse generator to produce pulses of definite length, the length being dependent upon the time constant of the resistor 220 and the capacitor 219. The purpose of the transistor 224 is to provide drive as well as a shift in the pulse level. The output pulse from the instant circuit varies between —6 volts and +6 volts and has a pulse period of approximately 130 μs. The ring drive associated with the scan ring SCR in FIG. 2c is referenced RD1 and its output line 226a. Two ring drives are associated with the time base ring of FIG. 2d, namely RD and RD1 having outputs 226 and 226a respectively.

TIME BASE RING

Figure 14:
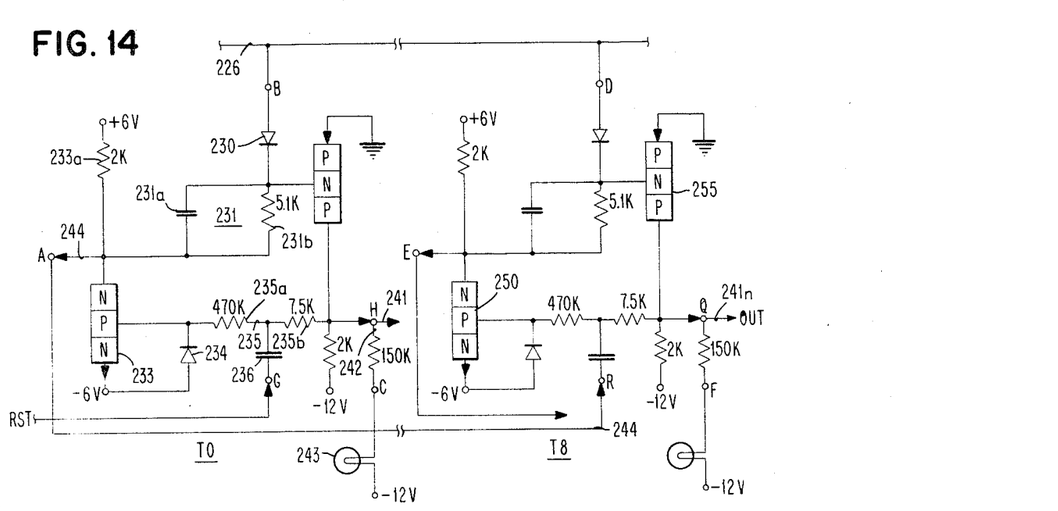
FIG. 14 shows details of a time base ring.

The ring TBR comprises a plurality of stages $T\phi$ through T8 each constituted of a pair of transistor triggers. As seen in FIG. 14, only two stages are shown, namely, the first and last stages. The first stage $T\phi$ comprises transistors 233 and 238. The right drive line 226 is connected to the collector of transistor 233 by way of a network including a diode 230 and a resistance capacitance network 231 consisting of resistor 231b and capacitor 231a. The base of transistor 238 is connected to the resistance capacitance network by way of a line 239. The collector of transistor 233 is connected to a +6 volt supply through a resistor 233a and also to an interstage coupling line 244 which is connected to the second stage R1. The emitter of transistor 233 is connected to a —6 volt supply, which voltage is also applied to the base of the transistor by way of a diode path 234. The base of the transistor 233 is also connected to the collector of transistor 238 by way of a path 235 containing resistors 235a and 235b at the midpoint of which is connected a reset line RST having a capacitor 236 interposed therein. The output from the second transistor 238 is passed on to an output line 241 connected to the storage matrix. The output line 241 is also connected to a line 242 which includes an indicator 243 connected to a —12 volt supply.

When the ring is off, both transistors in each stage are off, i.e., nonconducting. To initiate operation of the ring a positive reset signal is transmitted from the reset means by way of reset line RST, through the capacitor 236 to cause transistor 233 to conduct. Conduction in the latter causes a voltage drop that is passed through the network 231 to the base of transistor 238 to cause the latter to conduct. Thus, with both transistors 233 and 238 conducting, the first stage $T\phi$ is now in its on state. In this state, output line 242 is slightly below ground potential and causes the indicator 243 to turn on. When the ring drive signal is transmitted through the line 226, which is connected in common to all stages of the ring, only one stage at a time becomes responsive. In this instance with stage $T\phi$ being on and the next succeeding stage T1 off, the ring drive signal causes transistor 238 to turn off which action causes transistor 233 to turn off. The turning off of transistor 233 causes a positive signal (complement) to be transmitted through interstage coupling line 244 to the base of transistor 250 of the second ring stage T1. Transistor 255 is maintained in a non-conducting state even though transistor 250 is on. This condition prevails until the ring drive pulse terminates whereupon transistor 255 is driven into conduction. The second ring stage is now in its on state while stage 1, $T\phi$ and the remaining stages are off. The next ring drive signal transmitted through the line 226 causes the second stage, T1, to go off and stage T2, not shown, to turn on. In this manner each succeeding stage will be turned on while all the remaining stages are in their off state. The scan ring SCR in FIG. 2c is similar to the time base ring TBR both in structure and operation, and the stages thereof are referenced $S\phi$ through S8.

Figure 15:
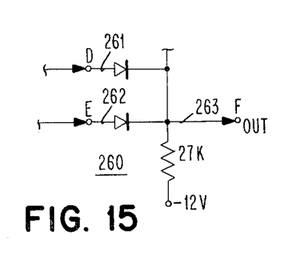
FIG. 15 shows details of an OR circuit.

An OR configuration 260 is shown in FIG. 15. The presence of a signal on either or both of two inputs 261 and 262 provides an output on line 263.

Figure 16:
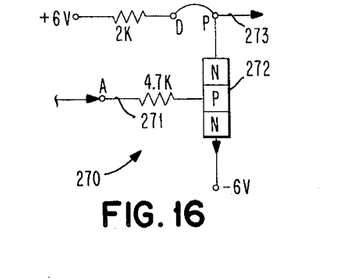
FIG. 16 shows details of an inverter.

An inverter 270 shown in FIG. 16 includes a resistive input line 271 connected to the base of transistor 272 having its emitter connected to a —6 volt supply and the collector resistively coupled to a +6 volt supply, and to an output line 273. The signal output is an inversion of the input signal presented to input line 271. The OR and inverter circuits shown in FIG. 2c are referenced 260a and 270a respectively with their ouputs referenced 263a and 273a respectively.

Figure 17:
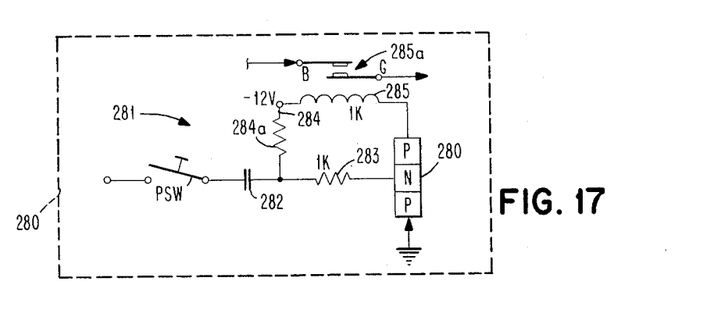
FIG. 17 shows details of a delay switch.

A delay switch 280 shown in FIG. 17 comprises a transistor 280 having a grounded emitter, and an RC network 281 connected to the base of transistor 280. The RC network includes a capacitor 282 and resistor 281. At a point 286 of the RC network a resistive path 284 including a relay coil 285 is connected to the collector of transistor 280. A power turn-on switch PSW is interposed between the capacitor 282 and a power supply which supplies appropriate voltages to provide a time delay of at least a second or more. The PSW switch, when closed, causes the coil 285 to energize and close associated contacts 285 following a delay determined by the time constant of the delay switch. This provides an output to reset the matrix latches by way of reset line RST.

A more detailed version of the invention is shown in FIGS. 2a through 2d. Speech sound enters the system by way of the microphone 1 through lines 2 and 3 to the pre-amplifier PA wherein the electrical signals are amplified under control of the AGC signals derived from appropriate AGC means located in the envelope peak detector EPD which communicates with the pre-amplifier PA by way of lines 25 and 26. The sensitivity of the pre-amplifier PA is adjusted for ambient noise conditions by means of a control 5. The outputs from the pre-amplifier PA are issued through lines 23, 24 and 25 and represent respectively a high frequency output containing high frequency noise-like components for operating the fricative selector FS, a middle range of frequencies from 250 c.p.s. to 3000 c.p.s. for operating the harmonic locator, and the low frequencies for operating the envelope peak detector EPD.

Figure 2D:
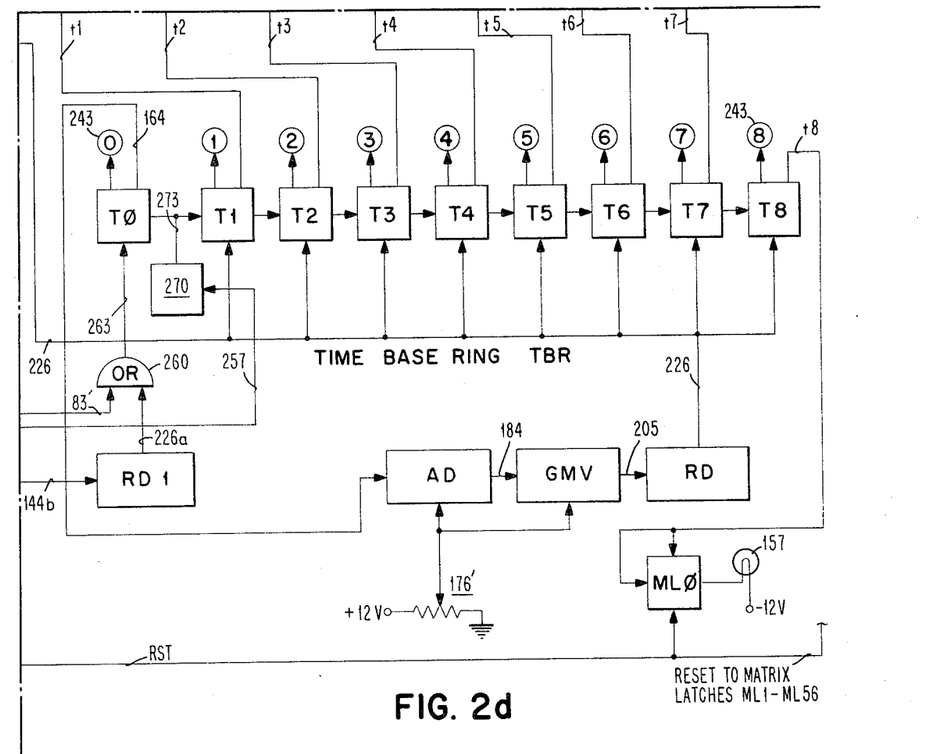

The output of the fricative selector FS is issued by way of line 144b, the driver RD1, OR circuit 260 to the time base ring TBR shown in FIG. 2d to initiate the activities of this ring. The output of the fricative selector FS is also transmitted to the storage matrix SM in FIG. 2b by way of a line 144a.

The storage matrix SM comprises a plurality of latches ML1 through ML56 arranged in rows and columns to form a coincidence type matrix in which each latch stores a bit of speech data which is characteristic of the spoken word. As an example, a speech sound in which the initial utterance is a fricative, will yield characteristics which will be stored in the latches comprising the top most row of the storage matrix SM, this top row consisting of latches ML1, ML9, ML17, ML25, ML33, ML41 and ML49. These latches are energized by a coincidence of signals appearing on the output line 144a in conjunction with signals issued on lines t1 through t7 issued under control of the time base ring TBR shown in FIG. 2d. The remaining latches in the matrix SM beginning with the second row from the top to the bottom row in FIG. 2b are utilized to store speech bits which are characteristic of spoken sounds initiated by a voiced sound. These speech characteristics are stored in these latches upon a coincidence of signals t1 through t7 issued by the timing ring TBR, and the integrated signals appearing on lines 144c through 144i issued respectively by the integrating pulse shapers IPS2 through IPS8 in turn energized by the scan ring signals appearing on the lines s2 through s8 in conjunction with harmonic signals issued by the harmonic locator HL by way of line 48, the latter signals covering the middle frequencies ranging between 250 c.p.s. through 3000 c.p.s.

As shown in the detailed drawings of FIG. 4, the output from the harmonic locator HL may be varied to control integration time. This control together with the controlled rate of advance of the rings yields a resolution of 5 scan cycles per timing ring cycle, providing a 40 ms. interval is allowed for a complete storage cycle of the storage matrix SM. This resolution is adequate to accommodate the storage of all bit characteristics yielded by the system in response to the input of the male voice for a pitch frequency of 125 c.p.s. and a period of 8 ms. Under certain conditions it may be convenient to bypass the integration stage and transmit the outputs of the harmonic locator HL directly into the storage matrix SM. It may be appreciated, however, that with integration a much smoother speech pattern is realized which is substantially identical with "formant" patterns. Moreover, the output of the harmonic locator HL yields "glides" as a function of time which must be quantized to have significance when discrete storage is used and with a degree of resolution which is commensurate with economy and other practical considerations.

From a further inspection of FIGS. 2c and 2d it is seen how the delay means AD, AD1 and AD2 are employed in the circuits for controlling the respective rings SCR and TBR. The details of the delay means have been fully described in connection with FIG. 11. The function of the delay means in the timing ring circuits is to provide a sufficient delay whereby the time interval for the first stage is equivalent to the time interval for any one of the succeeding stages of the ring. The potentiometers 176 and 176′ are utilized to control the rate of ring advance as well as to obtain the equivalent delay between stage 1 and the remaining stages. The articulation rate potentiometer 176′, in the case of the ring TBR, controls the delay means AD and the speed of the multivibrator GMV which has an inherent delay of ½ period. The delay means is set for a ½ period to provide a total delay of one whole period regardless of the setting of the articulation rate potentiometer.

The initiating signal for the ring TBR, in consequence to an initial fricative sound, is issued by way of line 144b, driver RD1, line 226a, OR circuit 260, line 263 to turn stage T$\phi$ off. As a result, an output on line 164 energizes delay means AD which in turn initiates the multivibrator GMV to provide pulses to the driver RD which in turn, through line 226, provides the driving pulses to advance the ring TBR, and during which successive vertical columns of the storage matrix SM are energized as an incident to the storage of sound bit characteristics. When the ring advances through stage T8, a matrix latch ML$\phi$ including an indicator 157 is turned on to indicate the end of the storage cycle.

A new storage cycle is initiated by depressing the reset key in FIG. 2c, to turn on the stage T$\phi$ by way of lines 256 and 257, inverter 270 and output line 273. When a new cycle is initiated either by an initial fricative, or a voiced sound, stage T$\phi$ is turned off and stage T1 is turned on. Thereafter the ring advances by means of driver pulses impressed on the line 226 in the manner described. When the ring SCR advances through the last stage, the beginning stage S$\phi$ is turned on following a delay and this is by means of a path extending from stage S8 through line 256, delay means AD2, line 184 to stage S$\phi$. The initial stage S$\phi$ may also be turned on by the reset key through line 256, line 258, inverter 270a and the line 273a.

When a voiced sound occurs, both the rings SCR and TBR are energized, the ring TBR by way of lines 83 and 83′, OR circuit 260, line 263, to stage T$\phi$, stage S$\phi$ being energized by way of lines 83 and 83′. Following energization of stage S$\phi$, a signal issues through lines 163 through delay means AD1, line 184, OR circuit 260a, line 263a, multivibrator GMV1, line 205a, driver RD2, line 226b to supply advance pulses to ring SCR. When the ring advances through stage S, an output passes through line 265, delay means AD2, line 184b to turn on stage S$\phi$. The delay means is used to delay scan ring outputs until after termination of the fundamental frequency from the harmonic locator HL.

Once started, the timing ring TBR energizes successive vertical columns of the storage matrix at a rate determined by the articulation rate means 176′. The scan ring SCR advances to successively energize the integrating shapers IPS2 through IPS8 which in turn successively energize the horizontal rows of the matrix, the coincident energization of these horizontal and vertical columns of the storage matrix causes appropriate matrix latches to storage signal patterns representing the sound characteristics of the spoken words.

The following table is given to shown how the inverse time function for frequency divides the speech spectrum into appropriate bands which are denser at the lower end of the frequency scale than at the higher end. When the delay beyond the fundamental is 0.3 ms. and the time interval for the scan ring is 0.6 ms., the equivalent frequency bands are:

| T (ms.): | $f$ (c.p.s.) |
|---|---|
| 0.3–0.9 | 1100–3300 |
| 0.9–1.5 | 666–1100 |
| 1.5–2.1 | 475–666 |
| 2.1–2.7 | 370–475 |
| 2.7–3.3 | 300–370 |
| 3.3–3.9 | 255–300 |
| 3.9–4.5 | 222–255 |

Observation of the harmonic locator output motion during vocal glides reveals this output motion to be substantially uniform throughout the formant range. This uniformity in output lends substantial support to the notion that the present invention and the time domain concept for frequency measurement is more in line with what is believed to be the modus operandi of the human brain in its analysis of speech sounds.

While the invention has been particularly shown and described with reference to preferred embodiments thereof, it will be understood by those skilled in the art that various changes in form and details may be made therein without departing from the spirit and scope of the invention.

What is claimed is:

1. A speech analyzing system providing signal bits, characteristic of speech sounds, as a function of time comprising:
    means for converting speech sounds into electrical waveforms,
    amplifying means responsive to said electrical waveforms to provide a medial range of harmonic frequencies, and low frequency components,
    a harmonic locator responsive to the medial range of frequencies to supply appropriate harmonic signals corresponding to the harmonics present,
    a detector responsive to the low frequencies to provide a fundamental voice signal as a consequence of a speech sound initialized by a voice sound,
    a scan ring rendered operable in response to said fundamental voice signal to provide a succession of scan signals, and
    means jointly responsive to said scan signals and the harmonic signals to provide the signal bits, characteristic of speech sounds, as function of time.

2. A system as in claim 1 further including a timing ring for issuing a succession of timing signals, and means jointly responsive to said succession of timing signals and the signal bits for issuing the latter as a function of said timing signals.

3. A system as in claim 2 further including integrating means responsive to the harmonic signals for supplying integrated harmonic output signals.

4. A system as in claim 3 further including a coincidence storage matrix comprising a plurality of coincidence type storage latches arranged in columns and rows, including means for interconnecting the timing ring signals and the integrated harmonic output signals to corresponding column and row latch input connections for storing the integrated bit signals as a function of the timing and scan rings.

5. A system as in claim 4 in which said scan ring includes a feedback loop between the first and last stages, including a delay means in said loop to prevent the first stage from turning on until after the passage of the harmonic locator output.

6. A system as in claim 5 further including a source of multivibrator driving pulses for advancing each of the rings, including adjustable delay means for adjusting the time interval of the first stage with respect to the time intervals of succeeding stages in each of said rings.

7. A system as in claim 3 in which said amplifying means further includes means for providing high frequency noise-like components in response to the presence of signals caused by fricative sounds.

8. A system as in claim 7 further including alternate means for initiating the action of the timing ring in response to the presence of the high frequency components as a consequence of a speech sound initialized by a fricative sound.

No references cited.

KATHLEEN H. CLAFFY, Primary Examiner

C. JIRAUCH, Assistant Examiner